May 17, 1960         G. M. HOLLEY, JR., ET AL         2,936,774
PUMP ASSEMBLY WITH AIR COOLED MOTOR
Filed Nov. 13, 1956

INVENTORS
GEORGE M. HOLLEY JR.
BY & JOHN E. SMITH.

Walter Patarulo, Jr.

ATTORNEY

United States Patent Office 2,936,774
Patented May 17, 1960

2,936,774
PUMP ASSEMBLY WITH AIR COOLED MOTOR

George M. Holley, Jr., Grosse Pointe Park, and John E. Smith, St. Clair Shores, Mich., assignors to Holley Carburetor Company, Van Dyke, Mich., a corporation of Michigan Application November 13, 1956, Serial No. 621,754

11 Claims. (Cl. 137—338)

This invention relates to pumps, and more particularly to submerged type pumps for fuel or other systems.

Automotive fuel systems, particularly pressure or injection systems, usually employ a fuel pump of some kind operative as soon as the ignition switch is closed to immediately supply the remainder of the system with fuel from the fuel tank. For various reasons, such as to conserve available space for other accessories and to keep initial fuel pressure losses at a minimum, it has been suggested that this pump and its electric driving motor be mounted inside the fuel tank.

While this may be desirable or even necessary, it raises other problems which must be overcome, one of these problems being that of cooling the motor where it is of the type that must be protected from contact with the fuel. Also, it is desirable to prevent the motor from heating the fuel in the tank.

Another problem in this type of installation is that of reducing the drain on the vehicle battery by maintaining the current requirements of the electric motor at a minimum. If a positive rotary seal is required between the motor and the pump, the friction due to the seal at least limits the possibility of reducing the required motor input energy, which results in excessive drain on the battery and heating of the motor.

It is now proposed to provide a novel pump and driving motor construction of the submerged type which will overcome the above mentioned problems. This is accomplished in the embodiment of the invention shown by the drawing by forming the drive coupling between the motor and the pump to provide an air pump which is operative when the motor and pump are operating. The motor and pump housing is formed to provide a continuous air passage around the motor and the drive coupling, with the passage communicating at both ends thereof with atmosphere outside the fuel tank. In order to reduce motor current requirements, a low friction rotary seal between the motor and the fuel pump, just below the coupling, is deliberately employed. Thus, when the motor is operating, air is caused to flow through the air passage to cool the motor and to vent away from the motor any fuel vapors passing through the seal.

Figure 1:
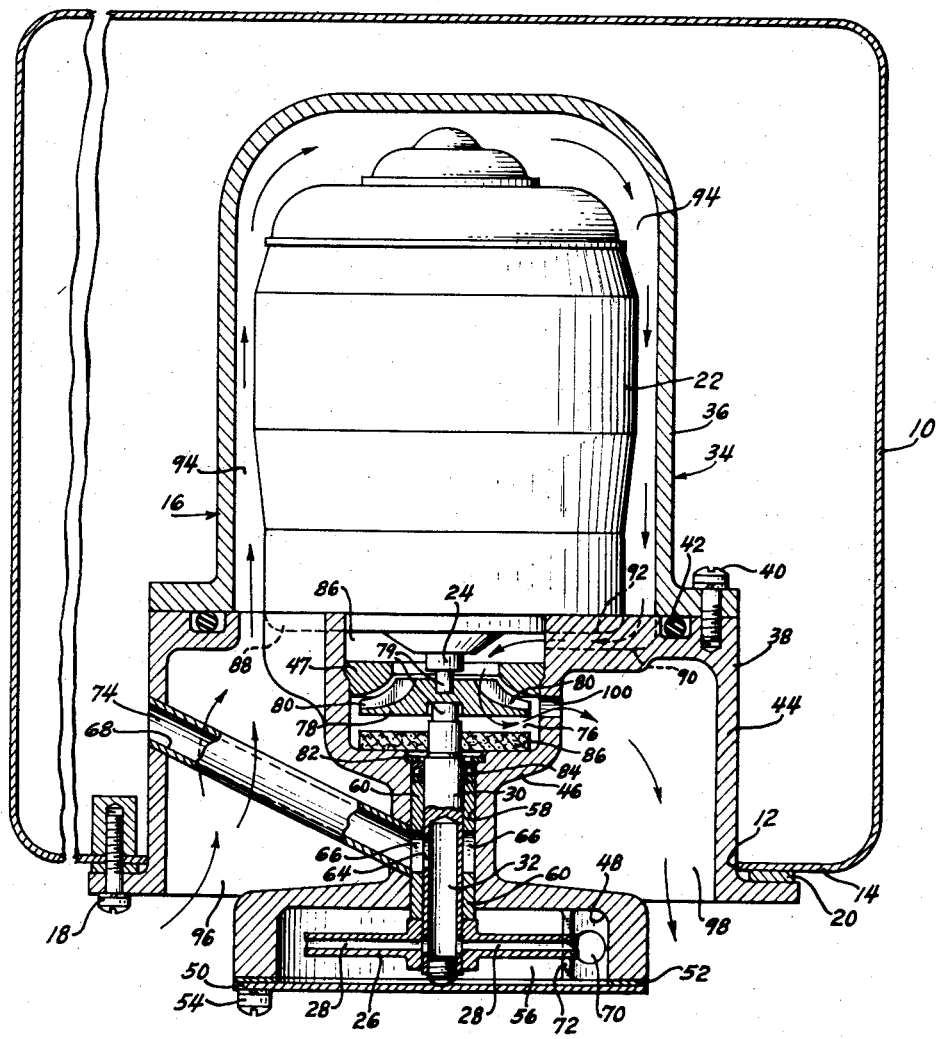
Figure 1 is an elevational cross-sectional view illustrating a fuel tank and submerged type pump assembly embodying the invention.
Figure 2:
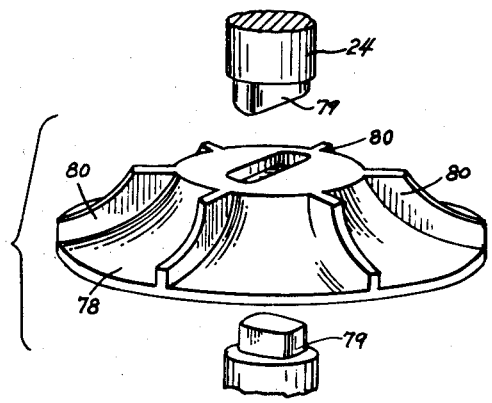
Figure 2 is an enlarged, exploded perspective view of the air pump element shown by Figure 1.

Referring to the drawing in greater detail, a fuel tank 10 may be provided with an aperture 12 in the bottom wall 14 thereof to receive the motor and pump assembly 16, which may be secured to the bottom wall of the tank by any suitable means such as the bolts 18 and the gasket 20. For reasons to be pointed out later, it is preferable to mount the assembly 16 near the rear of the tank 10 and with the left-hand side of the assembly 16 facing the front of the tank, as shown in the drawing.

The motor and pump assembly 16 may include a suitable, and preferably totally enclosed, electric motor 22 having a shaft 24 and an impeller type pump 26 having radial passages 28 and mounted on a pump shaft 30 having an axial passage 32. The pump 26 and motor 22 are encased in a housing 34 comprising an upper portion 36 and a lower portion 38 secured together by any suitable means such as screws 40 and an O-ring seal 42. The pump 26 is preferably located below the bottom wall 14 of the tank.

The lower portion 38 of the housing 34 may include a cylindrical outer wall 44 and a cylindrical inner portion 46 formed to provide an annular recess 48 receiving the impeller 26, the recess 48 being closed by means of a cover 50, gasket 52 and screws 54 to provide the chamber 56. A passage 58 extends axially from the chamber 56 to receive the pump shaft 30 which is mounted on bearings 60. Passages 32 and 64 in the hollow pump shaft 30 communicate with the space 66 between the bearings 60 and a passage 68 extending upwardly through the lower portion 44 of the housing 34 to admit fuel from the tank 10 to the pump 26. A fuel outlet passage 70 is provided in the wall defining the chamber 56 and a shoulder 72 is formed in the wall of the chamber 56 adjacent the outlet passage 70 to aid in the exit of fuel.

It is to be noted that the passage 68 may be formed by the use of a length of tubing of any desired size and shape, with the height of the opening 74 being the minimum distance permitted above the bottom wall 14 of the tank and facing the front of the tank. With this construction and with sufficient size and proper shape of the passage 68, there will always be sufficient fuel for the pump 26 despite temporary changes in tank fuel level due to acceleration, banking, etc.

The inner portion 46 of the lower housing 38 is formed in any suitable manner, as with a shoulder ring 47, to provide an annular chamber 76 adapted to receive a coupling 78 which connects the shafts 24 and 30 so that the motor 22 may drive the pump 26. This coupling may be of the double slider-crank or self aligning type, for instance, that has sufficient clearance with the 90 degree displaced rectangular shaft tangs 79 to take care of shaft axis misalignment. However, it is to be noted that this particular coupling 78 is formed with ribs or blades 80 to provide at the same time an impeller type centrifugal air pump within the chamber 76.

As an alternative structure, an ordinary coupling may be employed and a separate impeller, stamped propeller or any other suitable air pumping device may be press fit or otherwise secured for rotation with the motor or pump shaft in chamber 76.

Between the upper bearing 60 and the retainer ring 82 is disposed a low resistance shaft seal 84 of any suitable design. Naturally, the less resistance in the seal 84, the less current will be required to drive the pump 26 and the more fuel vapors will be admitted to the chamber 76. An absorbent member, such as the felt ring 86, may be provided above the seal 84 to prevent dust and other foreign matter from damaging the seal or the shaft 30.

Directly above the chamber 76 is another chamber 86 which is closed at the left-hand portion thereof by reason of the fact that the motor 22 engages or rests on the upper portion of the lower housing 38, as shown by the dotted line at 88. In contrast to this, the upper portion 90 of the lower housing 38 is spaced from the lower right-hand portion 92 of the motor 22 so as to provide communication between the chamber 86 and the space 94 between the motor 22 and the upper housing 36.

The lower housing 38 may be further formed to provide separate right and left-hand chambers 96 and 98, with the left-hand chamber 96 communicating with the space 94 around the motor 22 and with the right-hand chamber 98 communicating through the passage 100 with the chambers 76 and 86 and then with the space 94 around the right-hand side of the motor 22.

With the above construction, or its equivalent, it is apparent that whenever the motor is driving the pump 26, the coupling 78 will act as an air pump, causing air to flow through the assembly 16 as indicated by the arrows. In this manner, the motor 22 will be continuously air cooled so that heat from the motor does not heat up fuel and so that the motor will be ventilated; also, any fuel vapors passing through the low-friction seal 84 will be vented away from chamber 86 and out of the chamber 76 before they can reach the motor 22. In other words, cool air is continuously drawn into the assembly 16, and warm fuel vapor-laden air is continuously discharged to atmosphere. This construction permits the low-friction seal 84 to be used so that the current required for the motor 22 may be kept at a low value, and the aforementioned objections to this type of installation are eliminated.

This also eliminates fuel vapor problems caused by a worn seal. In a general fluid system, this construction would vent vapors that are corrosive or otherwise objectionable away from the motor.

It is apparent that various changes may be made in the embodiment shown in the drawing for illustrative purposes without exceeding the scope of the invention. For instance, the passage 68 may actually constitute a larger chamber formed by a part of the lower housing 38 to increase the capacity thereof. Also, an air filter may be provided for chamber 96. Furthermore, the application of the invention is not limited to fuel systems.

What we claim as our invention is:

1. In a fluid pump assembly, a housing containing a fluid conducting and motion transmitting shaft, separate first and second pumping means for pumping different fluids, said first pumping means being connected to one end of said shaft and formed so as to pump fluid through said shaft, said second pumping means being connected to the opposite end of said shaft, said first pumping means comprising a driven centrifugal pump member, said second pumping means comprising a driving centrifugal pump member.

2. In a fluid pump assembly, a housing containing a fluid conducting and motion transmitting shaft, separate first and second pumping means for pumping different fluids, said first pumping means being connected to one end of said shaft and formed so as to pump fluid through said shaft, said second pumping means being connected to the opposite end of said shaft, said first pumping means comprising a driven centrifugal pump member, said second pumping means comprising a driving centrifugal pump member, said second pumping means being formed to provide a self-aligning coupling adapted to connect said shaft with a rotary drive in a manner to minimize the effect of misalignment therebetween.

3. A fuel pump assembly comprising a fuel pump and a totally enclosed motor for driving said fuel pump, said pump and motor being connected by a drive coupling formed externally to provide a centrifugal air pump, assembly including a housing for said fuel pump and said motor, said housing including a separate chamber for said air pump and a continuous unrestricted air passage around said motor and through said air pump chamber, said air passage communicating at both ends thereof with atmosphere, said air pump being adapted to flow atmospheric air through said air passage to first cool said motor at a rate dependent upon ambient air temperature and to subsequently vent said air pump chamber of any fuel vapors.

4. A fuel pump assembly comprising a fuel pump and a motor for driving said fuel pump, said pump and motor being connected by a drive coupling formed externally to provide a centrifugal air pump, said assembly including a housing for said fuel pump and said motor, said housing including a fuel inlet passage forming an integral reservoir for said fuel pump, a separate chamber for said air pump and a continuous unrestricted air passage around said motor and through said air pump chamber, said air passage communicating at both ends thereof with atmosphere, said air pump being adapted to flow atmospheric air through said air passage to first cool said motor at a rate dependent upon ambient air temperature and to subsequently vent said air pump chamber of any fuel vapors.

5. A fuel pump assembly comprising a fuel pump and a totally enclosed motor for driving said fuel pump, said pump and motor being connected by a double slider-crank type drive coupling formed externally to provide a centrifugal air pump and adapted to compensate for fuel pump and motor misalignment, said assembly including a housing for said fuel pump and said motor, said housing including a fuel inlet passage forming an integral reservoir for said fuel pump, a chamber for said air pump and a continuous unrestricted air passage around said motor and through said air pump chamber, said air passage communicating at both ends thereof with atmosphere, said air pump being adapted to flow atmospheric air through said air passage to cool said motor at a rate dependent upon ambient air temperature and to vent said air pump chamber of any fuel vapors.

6. In a fluid system, the combination of a storage tank and pump assembly disposed within said tank, said assembly including a fluid pump and a motor for driving said pump, said assembly including a housing adapted to provide a chamber in said tank to receive said pump and said motor, said housing being formed to provide a substantially closed fluid chamber between said tank and said pump, said chamber having an inlet of relatively small area near the top thereof and being of suitable capacity and location to provide a temporary fluid reservoir for said pump in the event of temporary disturbances of fluid level in said tank so as to uncover said inlet.

7. In a fluid system, the combination of a storage tank and a pump assembly disposed within said tank, said assembly including a fluid pump and a motor for driving said pump, said assembly including a housing secured to said tank and being formed to provide a chamber in said tank to receive said pump and said motor, said housing including a separate fluid chamber having a confining inlet near the top thereof and being of suitable capacity and location to provide a priming reservoir for said pump in the event of temporary disturbances of fluid level in said tank so as to uncover said inlet.

8. In a fuel system for a road vehicle, the combination of a fuel tank and a fuel pump assembly disposed within said tank, said assembly including a fuel pump and a motor for driving said pump, said pump and motor being connected by a coupling formed to provide an air pump, said assembly including a housing adapted to provide a chamber in said tank to receive said fuel pump and said motor, said housing including a separate fuel chamber between said tank and said fuel pump, said fuel chamber being of sufficient capacity and having a confining inlet positioned to provide a temporary fuel reservoir for said fuel pump in the event of temporary disturbances of fuel level in said tank, a separate chamber for said air pump and a continuous air passage around said fuel pump and said motor and extending through said air pump chamber, said air passage communicating freely with the atmosphere at both ends thereof.

9. In a fuel system for a road vehicle, the combination of a fuel tank and a fuel pump assembly disposed within said tank, said assembly including a fuel pump and a motor for driving said pump, said pump and motor being connected by a coupling formed to provide an air pump, said assembly including a housing adapted to provide a chamber in said tank to receive said fuel pump and said motor, said housing including an inclined fuel passage from said tank to said fuel pump, said fuel passage being of sufficient capacity and positioned to retain a supply of fuel for said fuel pump even when said tank is tilted or the level of the fuel in said tank is momentarily displaced so as to lie below the inlet to said passage, a separate chamber for said air pump and a continuous air passage around said fuel pump and said motor and extending through said separate air pump chamber, said air passage communicating freely with the atmosphere at both ends thereof.

10. In an automotive fuel system, the combination of a fuel tank and a fuel pump assembly disposed within said tank, said assembly including a centrifugal fuel pump and a totally enclosed motor for driving said pump, said pump and motor each having a shaft, said pump and motor shafts being connected by a coupling adapted to compensate for misalignment of said shafts, said pump and motor being separated by a low friction seal coacting with one of said shafts, said coupling being formed to provide a centrifugal air pump, said assembly including a housing adapted to provide a chamber in said tank to receive said fuel pump and said motor, said housing including a separate chamber for said air pump and a continuous air passage around said motor and through said air pump chamber, said air passage communicating freely with the atmosphere at both ends thereof and being of sufficient capacity to flow all the air said air pump can deliver.

11. In a fuel system for a road vehicle, the combination of a fuel tank and a fuel pump assembly partially disposed within said tank, said assembly including a mechanical fuel pump and a motor for driving said fuel pump, the drive connection between said pump and said motor being formed to provide a centrifugal air pump and said pump and motor being separated by a low-friction seal, said fuel pump being disposed below the bottom wall of said tank so as to provide air cooling of said fuel pump, said assembly also including a housing providing a chamber in said tank to receive said fuel pump and said motor, said housing including a fuel passage from said tank to said fuel pump, a separate chamber for said air pump and a continuous unrestricted air passage around said motor and pump and through said air pump chamber, said air passage terminating at both ends thereof outside said tank so as to enable said air pump to pump atmospheric air in sufficient quantity to first effectively cool said motor at a rate dependent upon ambient atmospheric temperature and subsequently vent fuel vapors from said separate air pump chamber.

References Cited in the file of this patent

UNITED STATES PATENTS

| | | |
|---|---|---|
| 1,493,612 | Dennison | May 13, 1924 |
| 2,060,209 | Heckert | Nov. 10, 1936 |
| 2,312,525 | Curtis | Mar. 2, 1943 |
| 2,312,526 | Curtis | Mar. 2, 1943 |
| 2,410,973 | Hoover | Nov. 12, 1946 |

FOREIGN PATENTS

| | | |
|---|---|---|
| 518,644 | France | Jan. 7, 1921 |
| 565,271 | Great Britain | Nov. 3, 1944 |